United States Patent
Woodall et al.

(10) Patent No.: US 11,710,223 B2
(45) Date of Patent: *Jul. 25, 2023

(54) METHODS AND SYSTEMS FOR IMAGE PROCESSING WITH MULTIPLE IMAGE SOURCES

(71) Applicant: Pixelworks, Inc., San Jose, CA (US)

(72) Inventors: Neil Woodall, Newport Beach, CA (US); Yue Ma, Los Altos, CA (US); Bob Zhang, Santa Clara, CA (US)

(73) Assignee: Pixelworks, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/652,452

(22) Filed: Feb. 24, 2022

(65) Prior Publication Data

US 2022/0180493 A1   Jun. 9, 2022

Related U.S. Application Data

(63) Continuation of application No. 16/792,005, filed on Feb. 14, 2020, now Pat. No. 11,295,427.

(51) Int. Cl.
| | |
|---|---|
| *G06T 5/50* | (2006.01) |
| *H04N 5/265* | (2006.01) |
| *G06T 7/20* | (2017.01) |
| *G06T 5/00* | (2006.01) |
| *H04N 7/01* | (2006.01) |
| *G06T 5/20* | (2006.01) |

(52) U.S. Cl.
CPC ............ *G06T 5/50* (2013.01); *G06T 5/003* (2013.01); *G06T 5/20* (2013.01); *G06T 7/20* (2013.01); *H04N 5/265* (2013.01); *H04N 7/0127* (2013.01); *G06T 2207/10016* (2013.01); *G06T 2207/10152* (2013.01); *G06T 2207/20201* (2013.01); *G06T 2207/20221* (2013.01)

(58) Field of Classification Search
CPC .. G06T 5/50; G06T 5/003; G06T 5/20; G06T 7/20; G06T 2207/20201; G06T 2207/10152; G06T 2207/20221; G06T 2207/10016; H04N 5/265; H04N 7/0127
USPC .......................................... 382/107
See application file for complete search history.

(56) References Cited

U.S. PATENT DOCUMENTS

| | | | |
|---|---|---|---|
| 7,978,239 | B2 | 7/2011 | Deever et al. |
| 10,230,920 | B1 | 3/2019 | Yang et al. |
| 10,284,810 | B1 | 5/2019 | Shoa Hassani Lashdan et al. |
| 10,368,031 | B2 | 7/2019 | Xu et al. |
| 2005/0219642 | A1* | 10/2005 | Yachida ............... H04N 5/335 358/448 |

(Continued)

FOREIGN PATENT DOCUMENTS

CN      106204447 A      12/2016

*Primary Examiner* — Ali Bayat
(74) *Attorney, Agent, or Firm* — McCoy Russell LLP

(57) ABSTRACT

Various methods and systems are provided for image processing for multiple cameras. In one embodiment, a method comprises acquiring image frames with a plurality of image frame sources configured with different acquisition settings, processing the image frames based on the different acquisition settings to generate at least one final image frame, and outputting the at least one final image frame. In this way, information from different image frame sources such as cameras may be leveraged to achieve increased frame rates with improved image quality and a desired motion appearance.

9 Claims, 12 Drawing Sheets

(56) References Cited

U.S. PATENT DOCUMENTS

| | | |
|---|---|---|
| 2006/0006235 A1* | 1/2006 | Kurzweil ............... G06V 20/63 |
| | | 235/454 |
| 2006/0011718 A1* | 1/2006 | Kurzweil ............. G09B 21/007 |
| | | 235/379 |
| 2006/0015342 A1* | 1/2006 | Kurzweil ............. G06V 30/224 |
| | | 704/260 |
| 2007/0189386 A1 | 8/2007 | Imagawa et al. |
| 2009/0167909 A1 | 7/2009 | Imagawa et al. |
| 2010/0020210 A1 | 1/2010 | Tsunekawa et al. |
| 2011/0109802 A1 | 5/2011 | Lee et al. |
| 2011/0304687 A1 | 12/2011 | Joshi et al. |
| 2014/0132735 A1* | 5/2014 | Lee .................... H04N 5/23232 |
| | | 348/47 |
| 2017/0054938 A1 | 2/2017 | Xu et al. |
| 2019/0141332 A1* | 5/2019 | Shoa Hassani Lashdan ............... |
| | | H04N 19/59 |
| 2021/0258510 A1 | 8/2021 | Woodall et al. |

* cited by examiner

METHODS AND SYSTEMS FOR IMAGE PROCESSING WITH MULTIPLE IMAGE SOURCES

CROSS REFERENCE TO RELATED APPLICATIONS

The present application is a continuation of U.S. Non-Provisional patent application Ser. No. 16/792,005, entitled "METHODS AND SYSTEMS FOR IMAGE PROCESSING WITH MULTIPLE IMAGE SOURCES," and filed on Feb. 14, 2020. The entire contents of the above-referenced application are hereby incorporated by reference for all purposes.

FIELD

Embodiments of the subject matter disclosed herein relate to image processing for systems with multiple image sources.

BACKGROUND

As camera technology evolves from photographic film to digital image sensors, the size of a camera has decreased to the point that cameras are integrated into mobile devices, such as smart phones, that can be conveniently carried by users. Further advances in optical technology and image sensor technology has enabled such devices to include a plurality of cameras configured with different focal lengths and fields of view, which allow users to not only capture high-definition photographs but also high-definition video while easily switching between lenses without manually switching the lens.

BRIEF DESCRIPTION

In one embodiment, a method comprises acquiring image frames with a plurality of image frame sources configured with different acquisition settings, processing the image frames based on the different acquisition settings to generate at least one final image frame, and outputting the at least one final image frame. In this way, information from different image frame sources such as cameras may be leveraged to achieve increased frame rates with improved image quality and a desired motion appearance.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 7:
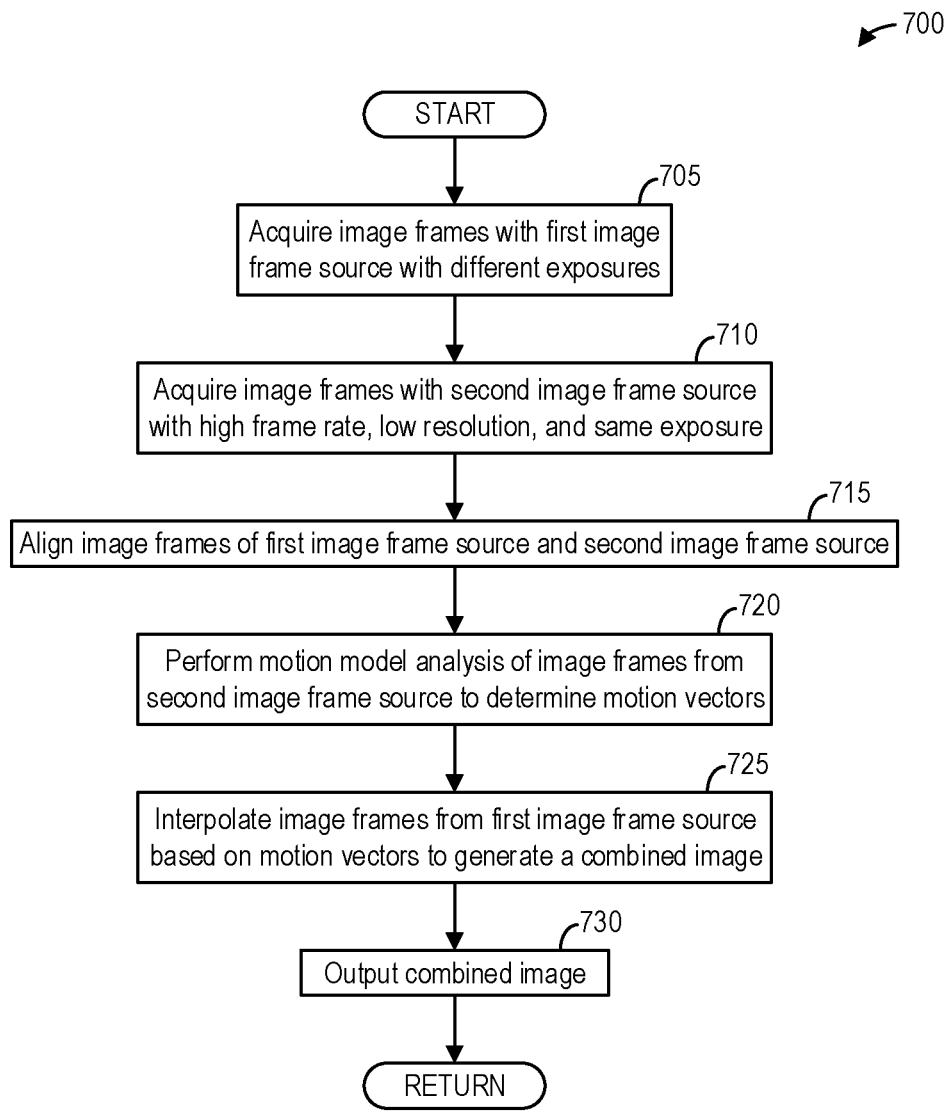
FIG. 7 shows a high-level flow chart illustrating an example method for generating a high-dynamic-range image based on image frames acquired with multiple image frame sources according to an embodiment.
Figure 8:
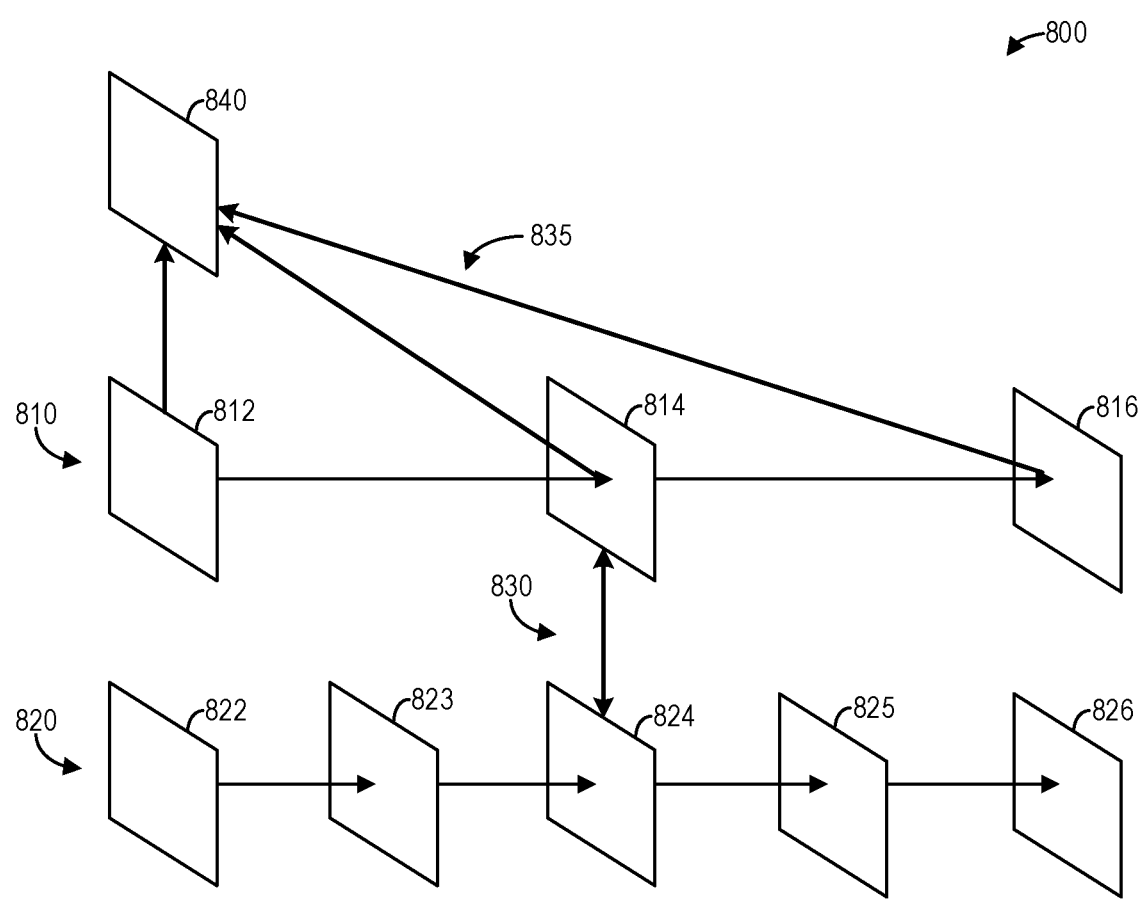
FIG. 8 shows a high-level block diagram illustrating a method for leveraging image frames with a same exposure to improve interpolation of image frames with different exposures to generate a high-dynamic-range image according to an embodiment.
Figure 9:
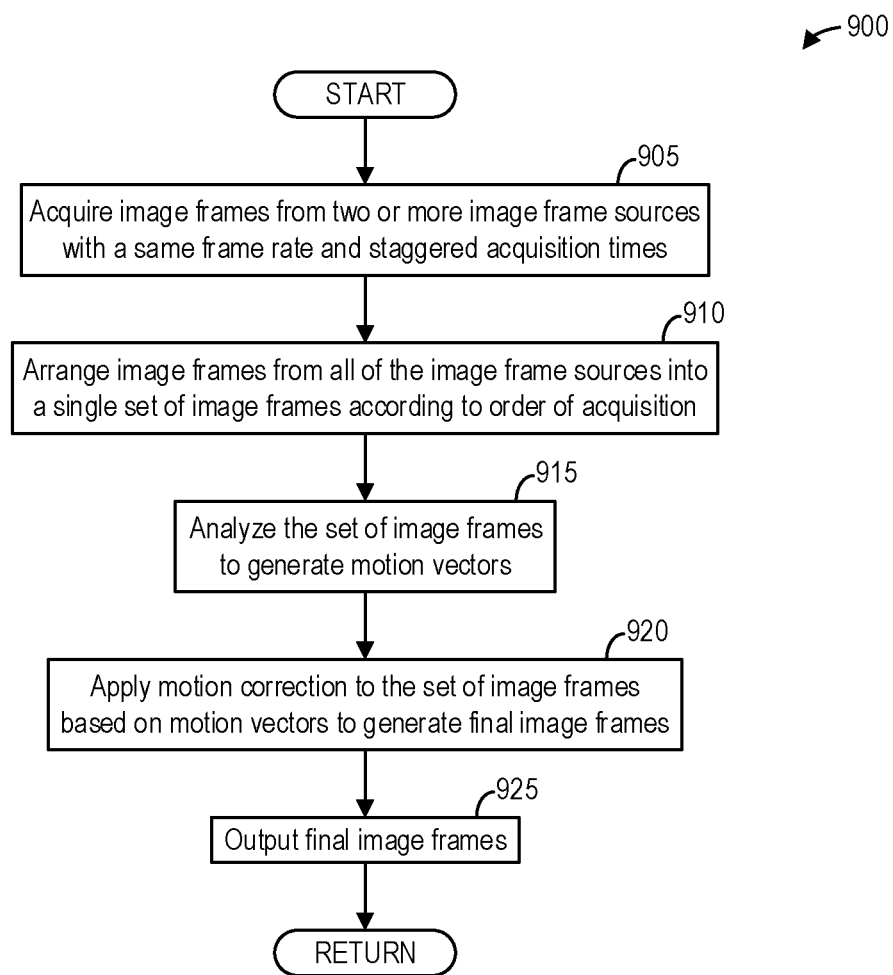
FIG. 9 shows a high-level flow chart illustrating an example method for generating high-frame-rate video from output of a plurality of image frame sources acquiring at low frame rates according to an embodiment.
Figure 10:
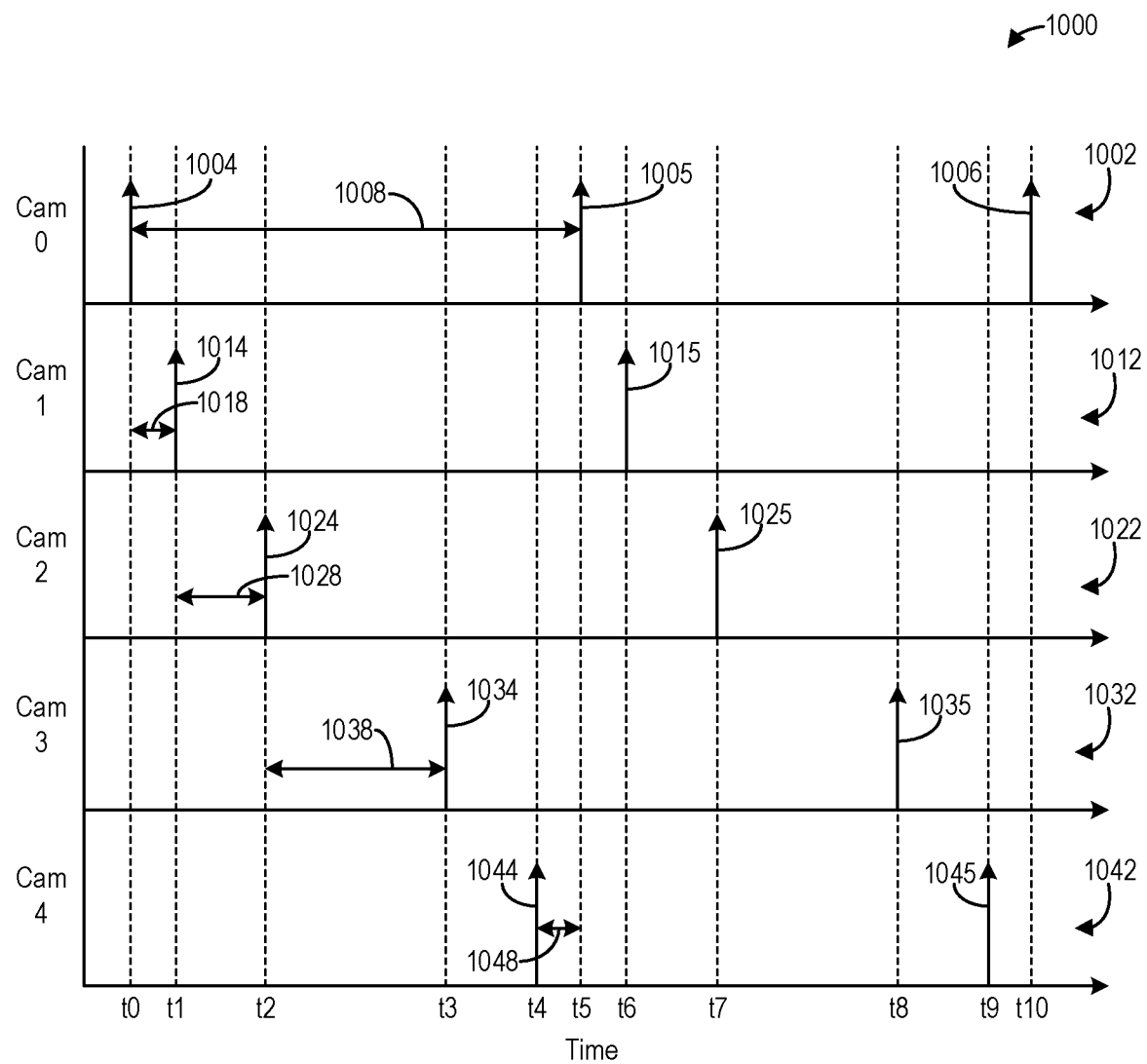
FIG. 10 shows a high-level diagram illustrating acquisition times for a plurality of image frame sources to generate high-frame-rate video according to an embodiment.
Figure 11:
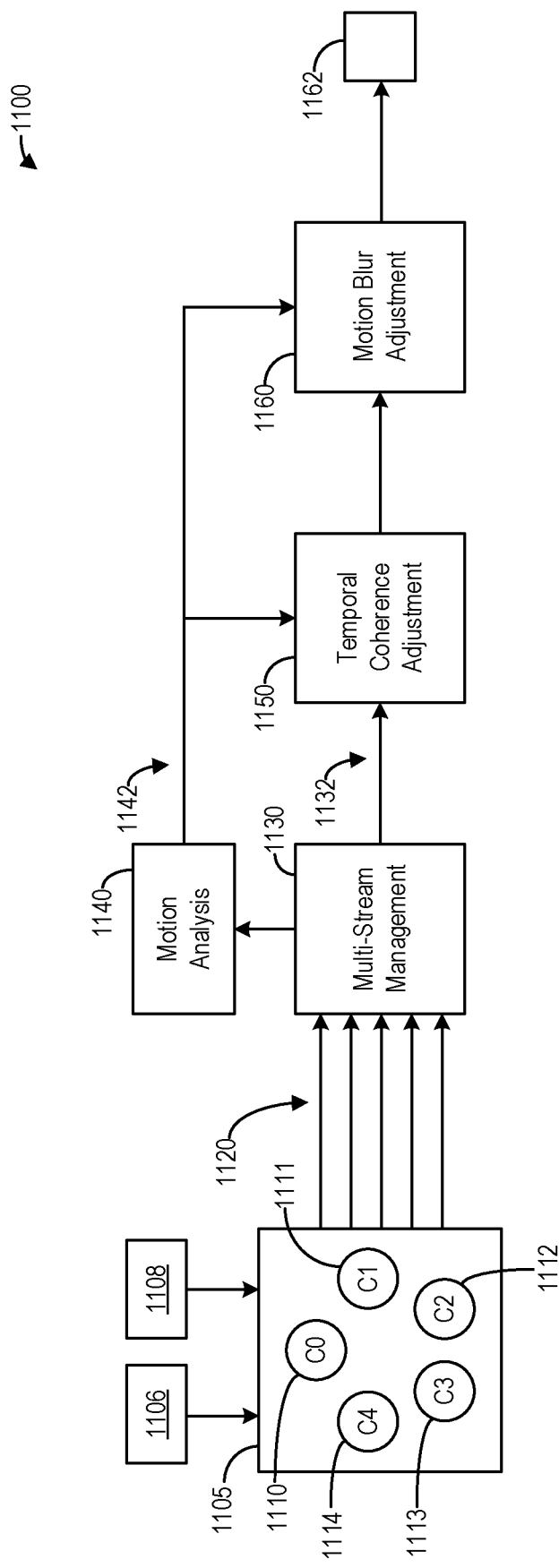
FIG. 11 shows a high-level block diagram illustrating an example data flow for managing multiple image frame streams with adjustments for temporal coherence and motion blur according to an embodiment.
Figure 12:
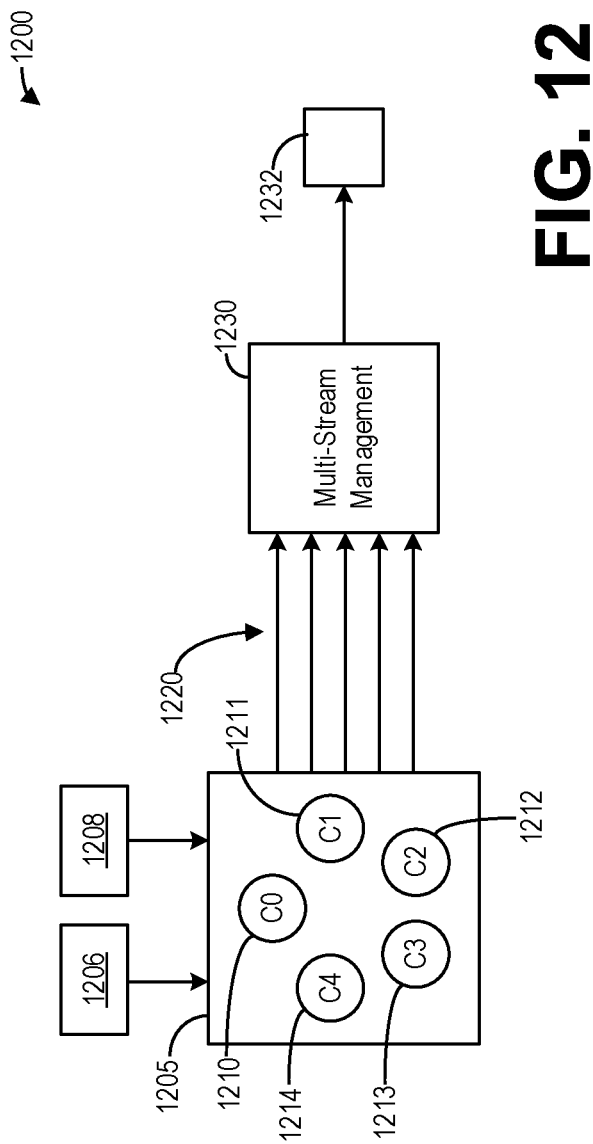
FIG. 12 shows a high-level block diagram illustrating an example data flow for managing multiple image frame streams according to an embodiment.
Figure 13:
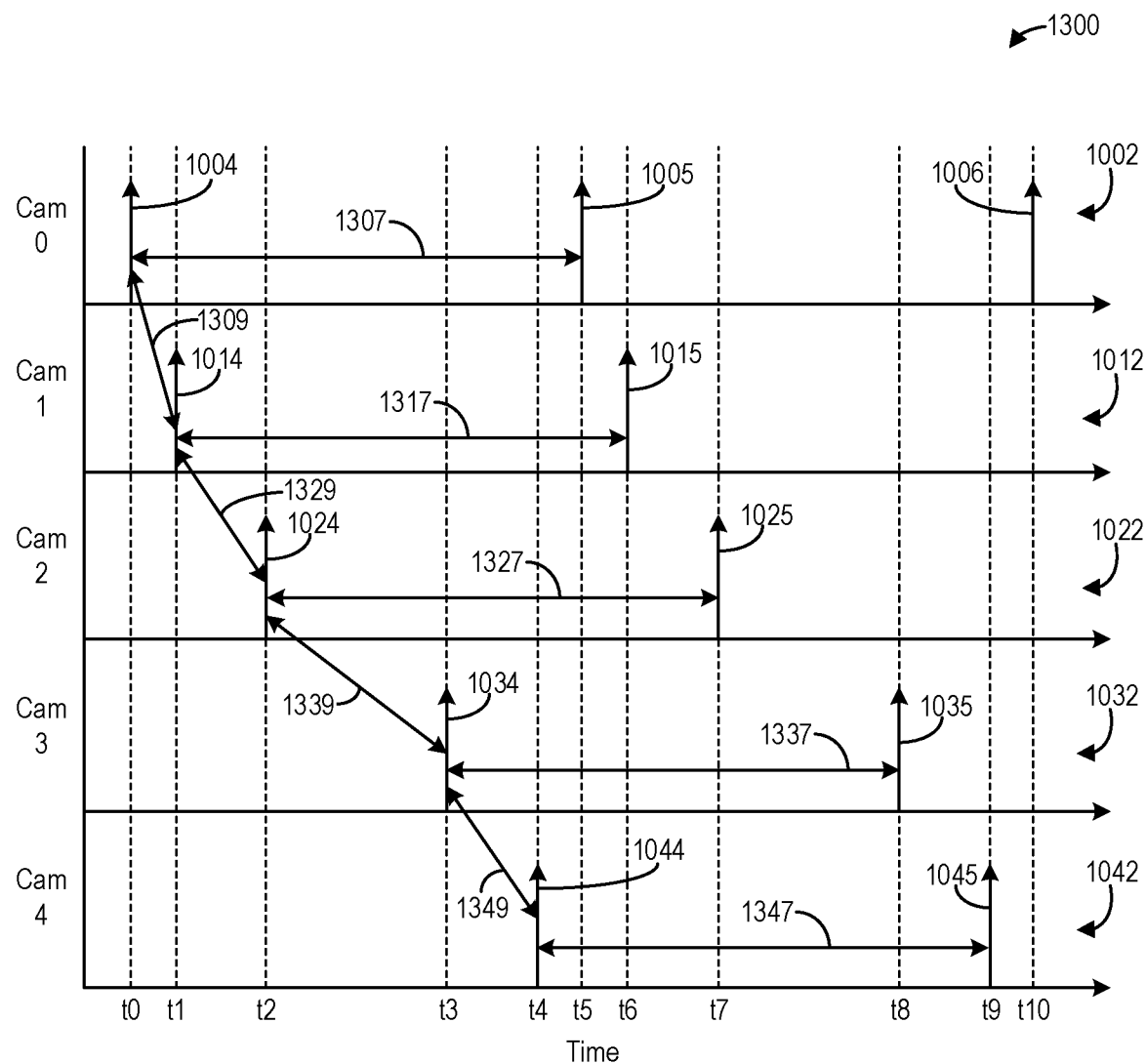
FIG. 13 shows a high-level diagram illustrating motion vectors for a plurality of image frame sources according to an embodiment.

The following description relates to various embodiments of image processing. In particular, systems and methods are provided for image processing for multi-camera systems. An image processing system, such as the system depicted in FIG. 1, may include a plurality of cameras or image frame sources that record image frames. The output of the multiple cameras may be processed to produce video with a high frame rate (e.g., a frame rate higher than 24 frames per second) with a desired motion appearance. To that end, a method for image processing, such as the method depicted in FIG. 2, leverages the information from the image frames acquired with different cameras to generate an improved image frame or video comprising a series of image frames. For example, as shown in FIGS. 3-6, two cameras may acquire video at different frame rates and different resolutions, and the motion estimated in the higher frame rate video may be used to improve interpolation of higher resolution, lower frame rate video to produce high-resolution, high-frame rate video. As another example, a first camera may acquire image frames with different exposure settings while a second camera acquires image frames with consistent exposure settings, and the image frames from the second camera may be used to improve interpolation of the image frames from the first camera to produce high-dynamic-range (HDR) images or video, as shown in FIGS. 7 and 8. As yet another example, image frames may be acquired at a same frame rate with a larger plurality of cameras and may be combined or fused into a single video with a higher frame rate, as shown in FIG. 9. By adjusting the intervals between initial acquisition times for the different cameras, as shown in FIG. 10, the motion appearance of the final video may be smoothed or otherwise adjusted as desired. The various image frame streams may be used to adjust temporal coherence and motion blur for a single image frame stream formed from the various image frame streams, as depicted in FIG. 11, or may simply be combined into a single image frame stream without down-stream corrections, as depicted in FIG. 12. Motion vectors may be calculated between adjacent image frames from each image frame source as well as between image frame sources, as depicted in FIG. 13.

Figure 1:
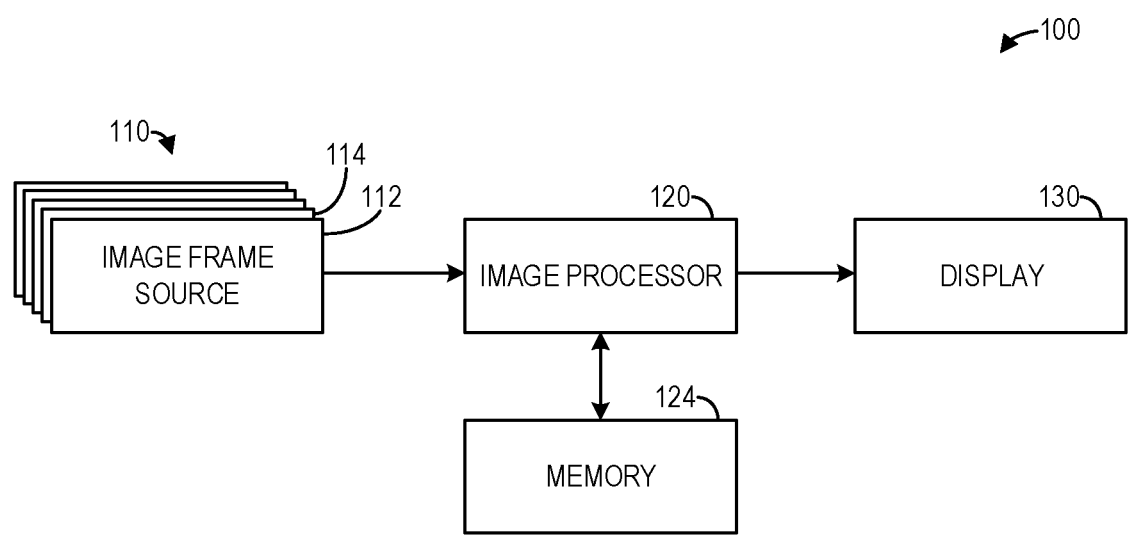
FIG. 1 shows a high-level block diagram illustrating an example image processing system for processing output from a plurality of image frame sources according to an embodiment.

FIG. 1 shows a high-level block diagram illustrating an example image processing system 100 for processing output from a plurality of image frame sources 110. The components of the image processing system 100 may be combined in a shared enclosure (not shown), in some examples, such as within a single camera apparatus or a mobile phone. Alternatively, one or more components of the image processing system 100 may be configured as peripheral devices that may be communicatively coupled to form the image processing system 100.

The plurality of image frame sources 110 includes at least a first image frame source 112 and a second image frame source 114. Each image frame source of the plurality of image frame sources 110 may comprise an image sensor or camera, for example, configured to acquire one or more image frames. The plurality of image frame sources may be positioned adjacent to each other, with a known relative positioning. The image frame sources may be different types of cameras and/or may be configured with different lenses, for example.

The image processing system 100 comprises an image processor 120 communicatively coupled to the plurality of image frame sources 110 and configured to receive image frames from the plurality of image frame sources 110. In some examples, the image processor 120 may be configured to control one or more of the image frame sources 110 to adjust one or more acquisition parameters. The image processor 120 is configured to process the image frames received from the plurality of image frame sources 110, as described further herein with regard to FIGS. 2-12. For example, the image processor 120 may leverage the information from image frames acquired by the image frame source 112 to improve image frames acquired by the second image frame source 114.

The image processor 120 may comprise one or more physical devices configured to execute one or more instructions. For example, the image processor 120 may comprise one or more processors that are configured to execute software instructions. Additionally or alternatively, the image processor 120 may comprise one or more hardware or firmware logic machines configured to execute hardware or firmware instructions. The image processor 120 may be single or multi-core, and the programs executed thereon may be configured for parallel or distributed processing.

The imaging processing system 100 further includes a memory 124 comprising non-transitory and transitory memory for storing instructions to be executed by the image processor 120 to perform the methods described further herein. The memory 124 may further provide a buffer and/or cache for storing data relating to the processing of image frames from the plurality of image frame sources 110, in order to support the functions of the image processor 120.

The image processing system 100 further comprises a display 130 communicatively coupled to the image processor 120 and configured to display one or more image frames output by the image processor 120 to the display 130. That is, the image processor 120 may present a visual representation of data held or output by the image processor 120 and/or the memory 124. The display 130 may comprise a display device utilizing virtually any type of technology.

Figure 2:
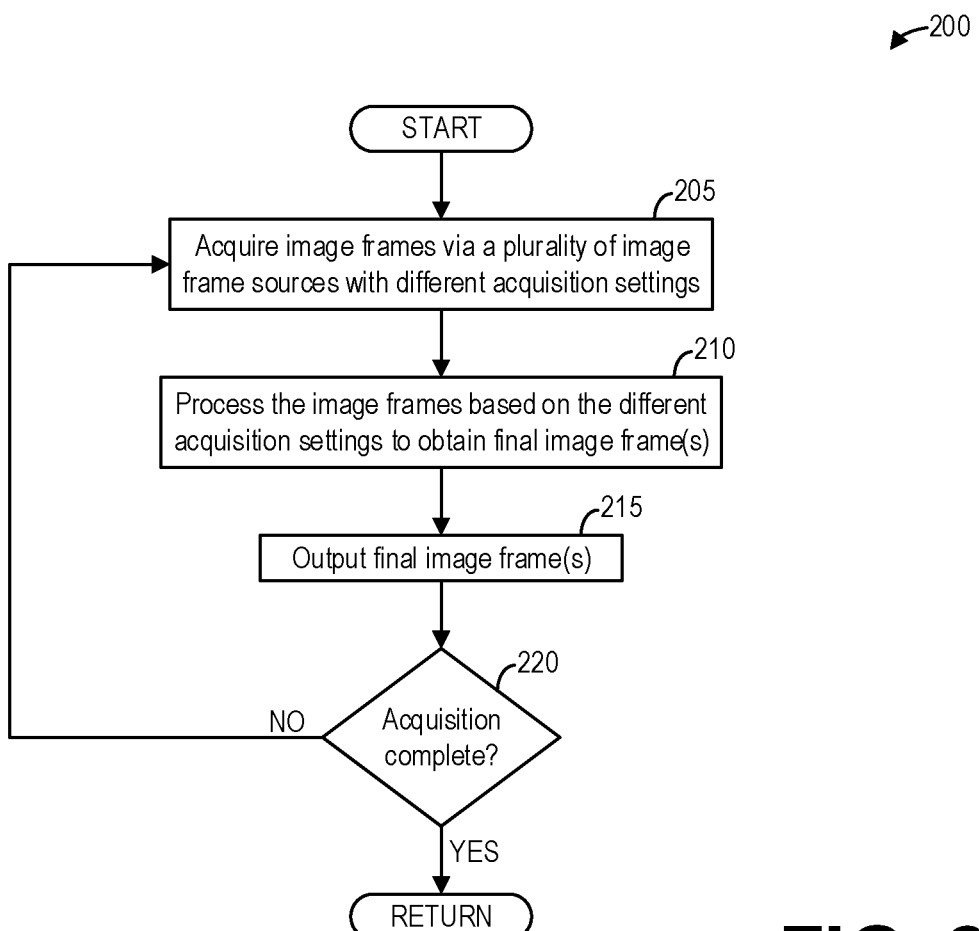
FIG. 2 shows a high-level flow chart illustrating an example method for image processing image frames from a plurality of image frame sources according to an embodiment.

FIG. 2 shows a high-level flow chart illustrating an example method 200 for image processing image frames from a plurality of image frame sources according to an embodiment. In particular, method 200 relates to acquiring image frames with multiple image frame sources, and leveraging the information of image frames from one source to improve the image frames of a second source. Method 200 is described with regard to the systems and components of FIG. 1, though it should be appreciated that the method 200 may be implemented with other systems and components without departing from the scope of the present disclosure. Method 200 may be implemented as instructions in memory 124, for example, executable by the image processor 120 to perform the actions described herein.

Method 200 begins at 205. At 205, method 200 acquires image frames via a plurality of image frame sources with different acquisition settings. For example, method 200 may acquire image frames with at least two image frame sources, wherein the two image frame sources are configured with different acquisition settings. For example, as described further herein with regard to FIGS. 3-6, a first image frame source may acquire image frames at a first frame rate and a first image resolution, while a second image frame source may acquire image frames at a second frame rate and a second image resolution, wherein the first frame rate is higher than the second frame rate and the first image resolution is lower than the second image resolution. As another example, as described further herein with regard to FIGS. 7 and 8, a first image frame source may acquire image frames with different exposure settings and a first frame rate, while a second image frame source may acquire image frames with consistent exposure settings and a second frame rate higher than the first frame rate. As yet another example, as described further herein with regard to FIGS. 9-12, a plurality of image frame sources may acquire image frames at a same frame rate but with staggered initial acquisition times and different shutter angles.

Thus, in some examples, method 200 may acquire the image frames directly from the plurality of image frame sources (e.g., in real-time). In other examples, the image frames may be acquired by the plurality of image frame sources prior to the execution of method 200, and so method 200 may acquire the image frames from non-volatile memory (e.g., not in real-time).

At 210, method 200 processes the image frames based on the different acquisition settings to obtain final image frame(s). For example, as described further herein with regard to FIGS. 3-6, motion estimation may be determined from high-frame-rate but low-resolution image frames, and then used to interpolate the low-frame-rate but high-resolution image frames into a high-frame-rate, high-resolution video. As another example, as described further herein with regard to FIGS. 7 and 8, motion estimation may be determined from the high-frame rate image frames with consistent exposure settings, which may then be used to adjust the image frames with different exposures for merging or interpolating into a single high-dynamic-range image frame. As yet another example, as described further herein with regard to FIGS. 9-12, motion estimation may be determined from the image frames of all image frame sources, which may be used to improve or adjust temporal coherence and motion blur as desired.

After processing the image frames at 210, method 200 continues to 215. At 215, method 200 outputs the final image frame(s). The final image frame(s) may be output as a video, in examples wherein a plurality of image frames are obtained, or as a single image frame. The final image frame(s) are output to at least one of a display such as display 130 and a memory 124.

At 220, method 200 determines whether the acquisition is complete. If the acquisition is not complete ("NO"), method 200 returns to 205 to continue acquiring image frames with the plurality of image frame sources. Once the acquisition is complete ("YES"), method 200 returns. Thus, the processing techniques described herein may be applied to image frames in real-time, so that image frames from a plurality of image frame sources may be processed to generate high-quality video, high-frame-rate video, high-dynamic-range video, and combinations thereof (e.g., high-quality, high-frame-rate video, high-quality HDR video, and so on). It should be appreciated that while the methods described herein may be performed in real-time, the methods are also applicable for post-processing of image frames during post-production (i.e., after image frames are acquired and stored in non-volatile memory).

Figure 3:
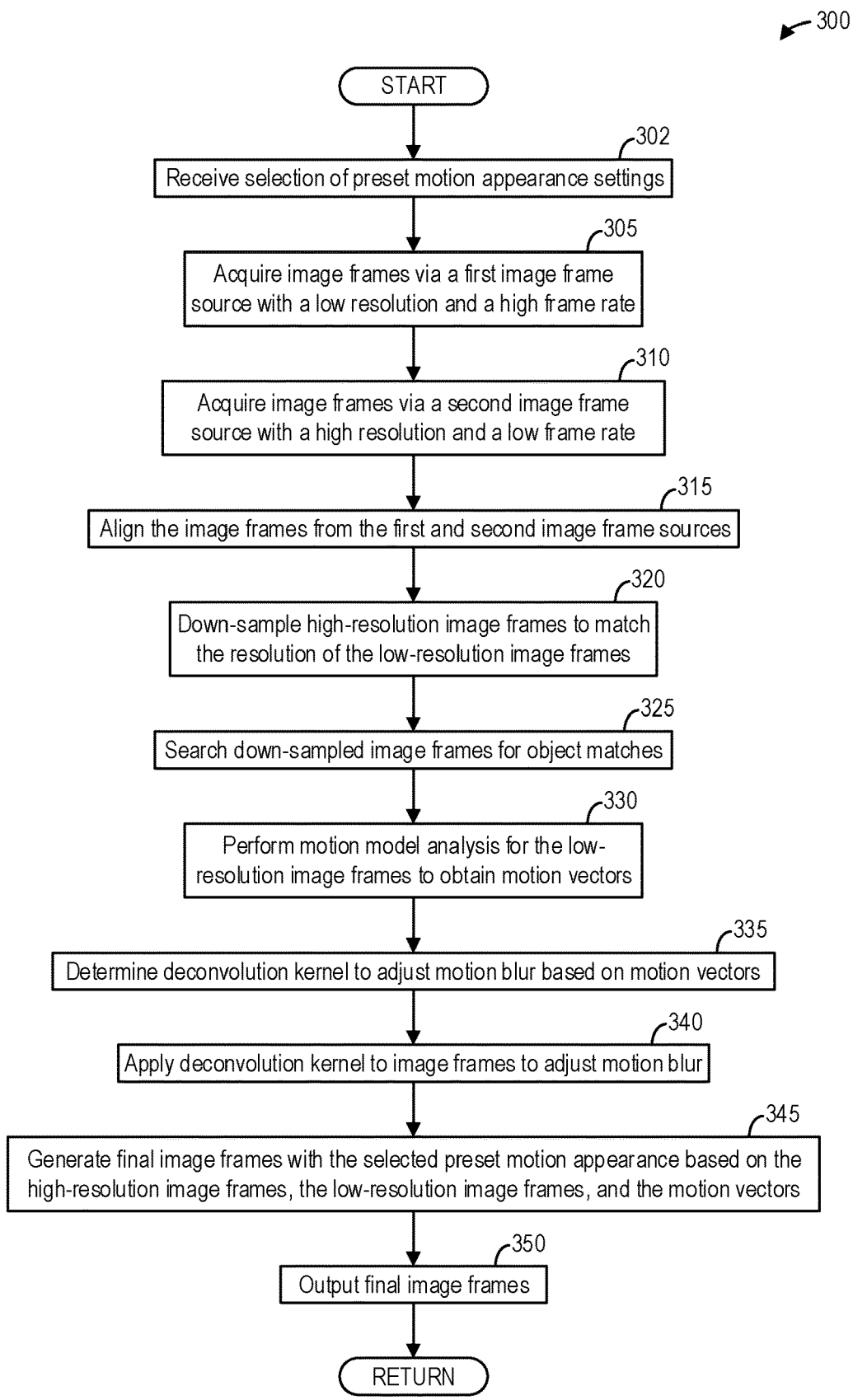
FIG. 3 shows a high-level flow chart illustrating an example method for image processing image frames from two image frame sources with different acquisition parameters according to an embodiment.

FIG. 3 shows a high-level flow chart illustrating an example method 300 for image processing image frames from two image frame sources with different acquisition parameters according to an embodiment. Method 300 is described with regard to the systems and components of FIG. 1, though it should be appreciated that the method 300 may be implemented with other systems and components without departing from the scope of the present disclosure. Method 300 may be implemented as instructions in memory 124, for example, executable by the image processor 120 to perform the actions described herein.

Method 300 begins at 302. At 302, method 300 receives a selection of preset motion appearance settings. For example, such preset motion appearance settings may be selected by a user according to the subject being imaged and/or the environment in which the subject is being imaged (e.g., sports or high-speed action, cinematic, low-light, landscape, portrait, and so on).

Continuing at 305, method 300 acquires image frames via a first image frame source with a low resolution and a high frame rate. For example, method 300 may control the first image frame source, such as the image frame source 112, to capture or acquire image frames with low image resolution and the high frame rate.

Meanwhile, at 310, method 300 acquires image frames via a second image frame source with a high resolution and a low frame rate. For example, method 300 may control the second image frame source, such as the image frame source 114, to capture or acquire image frames with high image resolution but a low frame rate. As an example, the image frames may be captured at a slower shutter speed to improve the signal-to-noise ratio, especially for low-light captures.

The initial starting time for acquiring the image frames with the first image frame source and the second image frame source may be controlled by the preset motion appearance settings selected at 302. For example, the starting times may be determined to define the base motion sample period, temporal coherence, shutter angle, and motion linearity. The starting time(s) may thus be adjusted according to different temporal coherence settings, where the higher the temporal coherence the larger the starting time interval between the initial captures.

At 315, method 300 aligns the image frames from the first and second image frame sources. For example, method 300 may time align or synchronize the timing of the image frames such that at least one image frame from the first image source is time-aligned with a corresponding image frame from the second image source. Further, as the image frame sources are physically distinct and thus physically separate, method 300 accounts for parallax when aligning the image frames based on known relative positioning of the first and second image frame sources. In some examples, method 300 uses global statistics to determine misalignment between image frames from the different image frame sources, and corrects the misalignment between the image frames accordingly.

Continuing at 320, method 300 down-samples the high-resolution image frames to match the resolution of the low-resolution image frames. Then, at 325, method 300 searches the down-sampled image frames for object matches. Method 300 may use the object matches found in the down-sampled image frames in order to improve the resolution.

At 330, method 300 performs motion model analysis for the low-resolution image frames to obtain motion vectors. Various types of motion models may be used to obtain the motion vectors. For example, method 300 determines motion vectors that describe the transformation from a first image frame of the low-resolution image frames to a second, subsequent image frame of the low-resolution image frames. Method 300 may determine the motion vectors for the regions of the image frames corresponding to the object matches found in the down-sampled image frames at 325 as well as block-based matches. In other examples, the motion estimation may be performed globally for the image frames.

At 335, method 300 determines one or more deconvolution kernels to adjust the motion blur based on the motion vectors. For example, the deconvolution kernel may be determined to reduce or remove motion blur or to introduce blur if additional blur is desired. Deconvolution kernels may be determined or adjusted between image frames based on the motion vectors. At 340, method 300 applies the deconvolution kernel(s) to the image frames to adjust the motion blur.

Thus, method 300 uses the high-frame-rate image frames to create a motion model of objects captured at a lower frame rate or a longer exposure, and then estimates how the objects are blurred due to the motion and the camera motion. Method 300 then generates a kernel corresponding to the blurring and sharpens the image frames with the kernel. Further, such blur kernels may be adjusted to change the effective shutter speed of the low-frame-rate high-resolution image frames.

At 345, method 300 generates final image frames with the selected preset motion appearance based on the high-resolution image frames, the low-resolution image frames, and the motion vectors. For example, method 300 may interpolate the high-resolution image frames to match the frame rate of the low-resolution image frames, with motion correction provided via the motion vectors. As another example, the phases of the final image frames may be selected based on the selected preset motion appearance, and the high-resolution image frames and low-resolution image frames may be interpolated to generate the final image frames at the phases, with adjustments to the motion vectors for phases of the final image frames that are not aligned with the phases of the low-resolution image frames. An example of how the sampling or phases of the final image frames may be adjusted for different motion appearance settings is discussed further herein with regard to FIG. 4.

At 350, method 300 outputs the final image frames. For example, method 300 may output the final image frames to the display 130. The final image frames are displayed as a video with the desired motion appearance via the display 130. Method 300 then returns.

In some examples, the first image frame source and the second image frame source may comprise different types of cameras. In such examples, the first image frame source may acquire the image frames according to phases as preset by the camera type, while the second image frame source may acquire higher-quality images based on a preset blur angle. The first camera may be used to create motion vectors, and these motion vectors may be used to convert the output of the second camera to the preset phases of the first camera. Depth information may be used to further refine the motion vectors when the first and second camera sampling time is the same. Thus the shutter angle, which defines the appearance of a video, may be set by the second, high-resolution camera, while the judder level may be adjusted by performing motion interpolation with the motion vectors between image frames captured by the first, lower-resolution camera.

Figure 4:
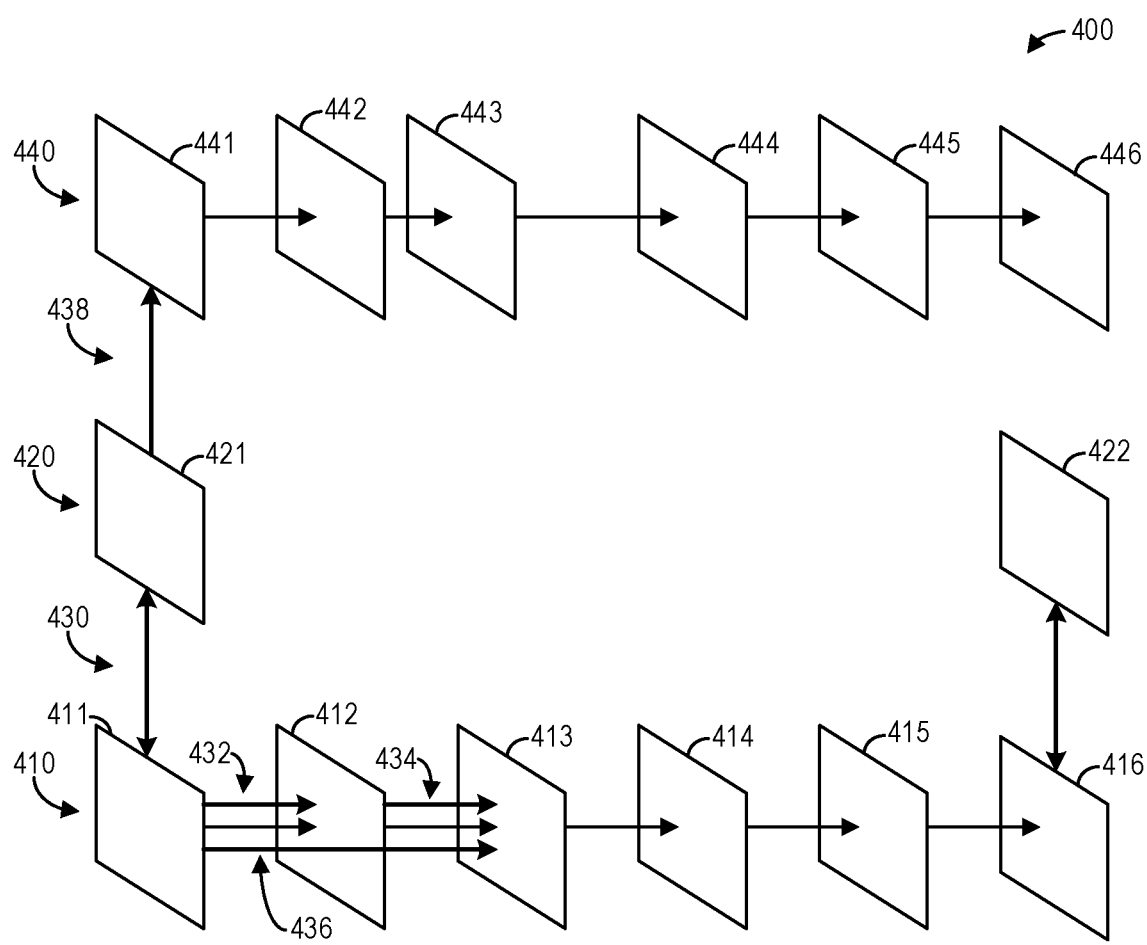
FIG. 4 shows a high-level block diagram illustrating an example method for leveraging motion estimation from high-frame-rate image frames to increase frame rate for high-resolution image frames according to an embodiment.

As an illustrative example, FIG. 4 shows a high-level block diagram illustrating an example method 400 for leveraging motion estimation from high-frame-rate image frames to increase frame rate for high-resolution image frames according to an embodiment. For example, method 400 visually depicts an example of method 300 wherein the desired output comprises high-resolution, high-frame rate video.

A first image frame source, such as the image frame source 112, acquires a first plurality of image frames 410 with a high frame rate and low resolution. The first plurality of image frames 410 includes a first image frame 411, a second image frame 412, a third image frame 413, a fourth image frame 414, a fifth image frame 415, and a sixth image frame 416, as depicted.

A second image frame source, such as the image frame source 114, acquires a second plurality of image frames 420 with a low frame rate and a high resolution. The second plurality of image frames 422 includes a first image frame 421 and a second image frame 422.

While the image frames 410 are depicted as equally spaced in FIG. 4, it should be appreciated that in general the image frames 410 may have any temporal spacing between captures. Similarly, the image frames 420 may also be captured with equal or unequal sampling times. Further still, the first image frame 411 and the first image frame 421, may be captured at a same time in some examples, or may be captured at slightly different times in other examples. Similarly, the sixth image frame 416 and the second image frame 422 may be captured at a same time or at slightly different times.

Method 400 determines motion vectors between the image frames of the first plurality of image frames 410, including a motion vector 432 between the first image frame 411 and the second image frame 412, a motion vector 434 between the second image frame 412 and the third image frame 413, and a motion vector 436 between the first image frame 411 and the third image frame 413. It should be appreciated that additional motion vectors are determined, including additional motion vectors characterizing motion of different objects between frames, and that the motion vectors depicted are illustrative and non-limiting.

Further, method 400 aligns 430 the camera outputs such that the first image frame 411 is aligned with the first image frame 421, and further such that the sixth image frame 416 is aligned with the second image frame 422. Method 400 then interpolates 438 the high-resolution image frames 420, aided by the motion vectors including motion vector 432 determined from the low-resolution image frames 410, to generate a plurality of final image frames 440 including a first final image frame 441, a second final image frame 442, a third final image frame 443, a fourth final image frame 444, a fifth final image frame 445, and a sixth final image frame 446. In some examples, the first final image frame 441 comprises the image frame 421, and the sixth final image frame 446 comprises the image frame 422.

The sampling of the final image frames 440, or the time intervals between each frame, may be determined or selected based on a preset motion appearance or a desired motion appearance. For example, a preset motion appearance may comprise a "Sports" motion appearance that may be selected for video content including rapidly-moving objects. For such a preset motion appearance, the sampling of the final image frames 440 may be equal, such that each image frame of the final image frames 440 is equally spaced. In this way, the final motion appearance of the final image frames 440 displayed as a video depicts smooth motion.

As another example, the preset motion appearance for a "Cinematic" motion appearance may be selected such that the final output video exhibits a "cinematic feel" that matches the look and feel of a movie or film played in a cinema. To obtain the cinematic feel with a reduction in judder, the sampling of the final image frames 440 may be unequal. In such an example, the output image frames 440 may include at least one image frame that is not time-aligned with any of the image frames from the first plurality of image frames 410 or the second plurality of image frames 420. As depicted, the third final image frame 443 is positioned between the second image frame 412 and the third image frame 413 of the first plurality of image frames 410. To properly interpolate the third final image frame 443, the motion vector 432 between the first image frame 411 and the second image frame 412 may be combined with a fraction of the motion vector 434 between the second image frame 412 and the third image frame 413. For example, expressing the motion vector 423 between the first image frame 411 and the second image frame 412 as MV12, and the motion vector 434 between the second image frame 412 and the third image frame 413 as MV23, a candidate for the motion vector 436 between the first image frame 411 and the third image frame 413, which may be expressed as MV13, may include a vector addition of the motion vectors 432 and 434:

$$MV13 = MV12 + MV23.$$

To interpolate the third final output frame 443 at a time interval or sampling between the second image frame 412 and the third image frame 413, a motion vector may comprise an adaptation of the motion vector 436:

$$MV13' = MV12 + k*MV23,$$

where k is a parameter between 0 and 1 for scaling the motion vector 434 or MV23, which may be determined according to the preset motion appearance to reduce judder in the final output image frames 440.

Further, if the output is at a lower frame rate than the high frame rate of the image frames 410, then the motion vectors for the image frames 410 would be converted to motion vectors at the lower frame rate. As the motion estimation involves tracking objects/blocks, motion vectors for a number of frames would thus be combined to track the object over a longer time period.

Figure 5:
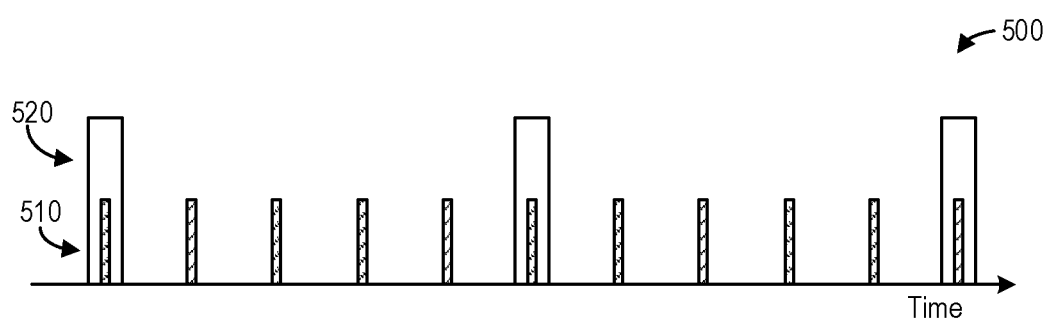
FIG. 5 shows a graph illustrating example acquisition timings of image frames with different image frame sources according to an embodiment.

FIG. 5 shows a graph 500 illustrating example acquisition timings of image frames with different image frame sources according to an embodiment. The graph 500 depicts acquisition timings for a first set of image frames 510, which may correspond to the first set of image frames 410 described hereinabove, as well as acquisition timings for a second set of image frames 520, which may correspond to the second set of image frames 420. That is, the first set of image frames 510 comprise low-resolution, high-frame-rate image frames while the second set of image frames 520 comprise high-resolution, low-frame-rate image frames. As depicted, the acquisitions may be synchronized such that each image frame of the second set of image frames 520 coincides with an acquisition of a corresponding image frame in the first set of image frames 510. However, in some examples, the acquisitions may be asynchronous or staggered such that high-resolution image frames and low-resolution image frames are not acquired at a same time. In such examples, the asynchronicity may be intentionally selected based on the preset motion appearance settings. Otherwise, the first set of image frames 510 or the second set of image frames 520 may be adjusted such that the image frames are time aligned.

Further, the exposure settings of the different image frames may be different. For example, as depicted, the exposure time for each image frame of the first set of image frames 510 is shorter than the exposure time for each image frame of the second set of image frames 520.

Figure 6:
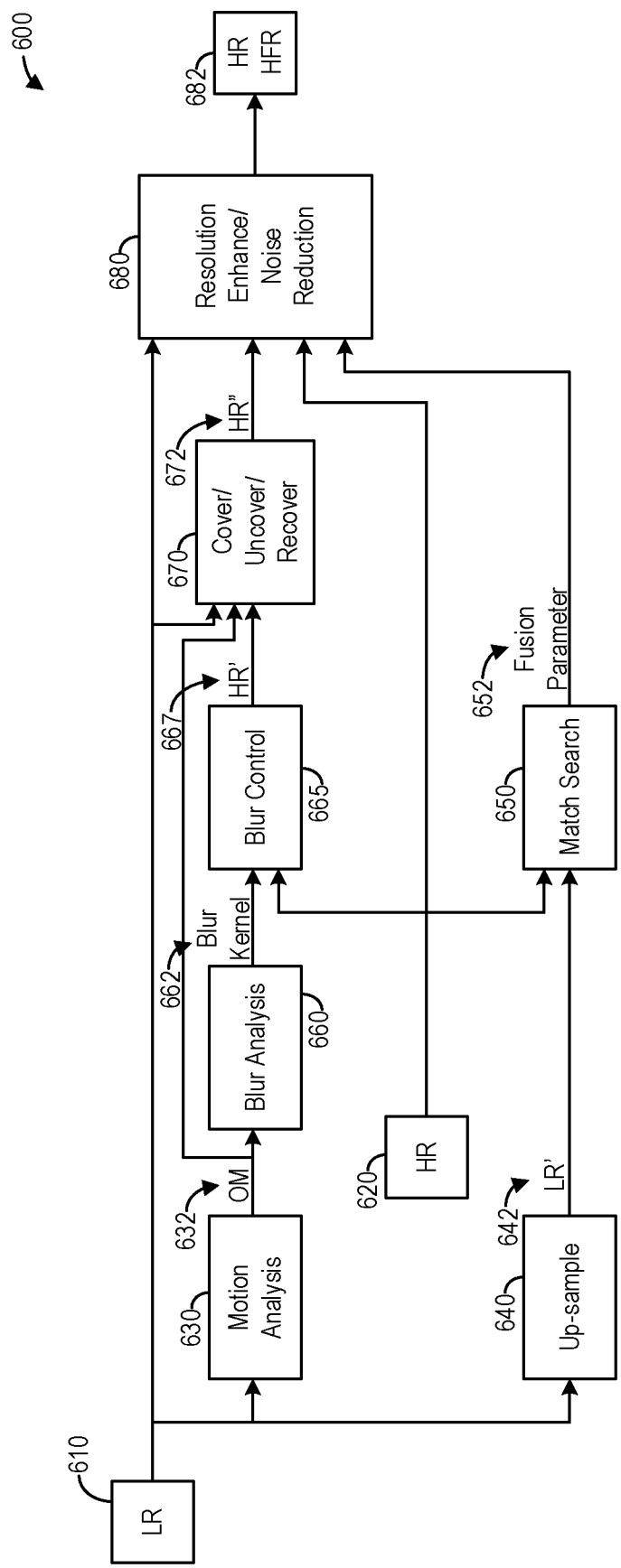
FIG. 6 shows a high-level block diagram illustrating an example method for image processing image frames from two image frame sources according to an embodiment.

FIG. 6 shows a high-level block diagram illustrating an example data flow 600 for image processing image frames from two image frame sources according to an embodiment. The data flow 600 depicts how low-resolution (LR) image frames 610 acquired at a high frame rate and high-resolution (HR) image frames 620 acquired at a low frame rate are processed to generate high-resolution, high-frame-rate video. The data flow 600 is therefore an example implementation of the method 300 described hereinabove for image processing image frames from two image frame sources with different acquisition parameters.

As depicted, motion analysis 630 is performed on the low-resolution image frames 610 to determine object motion (OM) 632 between the low-resolution image frames 610. The object motion 632 may be represented or characterized by one or more motion vectors between the image frames 610.

The object motion 632 is then use for blur analysis 660 to determine at least one blur kernel 662. For example, the blur analysis 660 determines one or more deconvolution kernels or blur kernels 662 to adjust the motion blur based on the motion vectors describing the objection motion 632. For example, the deconvolution or blur kernel may be determined to reduce or remove motion blur or to introduce blur if additional blur is desired. As depicted, the blur kernel 662 is applied to the high-resolution image frames 620 for blur control 665, thereby resulting in a first corrected high-resolution image frame (HR') 667.

Meanwhile, the low-resolution image frames 610 are up-sampled 640 to obtain up-sampled low-resolution image frames (LR') 642. In particular, the low-resolution image frames 610 may be up-sampled to match the resolution of the high-resolution image frames 620. A match search 650 is applied to the up-sampled low-resolution image frames 642 as well as the high-resolution image frames 620 to identify matching blocks between the high-resolution image frames. The match search 650 produces one or more fusion parameters 652 for fine-tuning the alignment between the low-resolution image frames 610 and the high-resolution image frames 620.

Further, the low-resolution image frames 610, the object motion 632 measured therefrom, and the first corrected high-resolution image frames 667 are input to a cover/uncover/recover module 670 for detecting covered, uncovered, or recovered regions. Cover/uncover/recover detection involves determining the regions, if any, in which a moving object either covers something that was previously uncovered, uncovers background that was previously covered, or recovers something that was previously covered and then uncovered. Such regions are referred to as occluded regions. The cover/uncover/recover module 670 thus compares the image frames 610 and 667, for example on a block-by-block basis, to identify occluded regions and correct motion vectors linked to the occluded regions. The cover/uncover/recover module 670 outputs second corrected high-resolution image frames (HR'') 672.

The low-resolution image frames 610, the high-resolution image frames 620, the second corrected high-resolution image frames 672, and the fusion parameter(s) 652 are then input to a resolution enhance/noise reduction module 680 which performs resolution enhancement, noise reduction, and interpolation based on the various inputs to produce a plurality of high-resolution, high-frame rate (HR HFR) image frames 682. The high-resolution, high-frame rate image frames 682 are output to one or more of a memory (e.g., memory 124), for storage and subsequent retrieval, and a display (e.g., display 130), for displaying the video comprising the plurality of high-resolution, high-frame-rate image frames 682.

As another example of leveraging information from multiple image frame sources to improve image processing, FIG. 7 shows a high-level flow chart illustrating an example method 700 for generating a high-dynamic-range (HDR) image based on image frames acquired with multiple image frame sources according to an embodiment. Method 700 is described with regard to the systems and components of FIG. 1, though it should be appreciated that the method 700 may be implemented with other systems and components without departing from the scope of the present disclosure. Method 700 may be implemented as instructions in memory 124, for example, executable by the image processor 120 to perform the actions described herein.

Method 700 begins at 705. At 705, method 700 acquires image frames with a first image frame source with different exposures. For example, the first image frame source, such as the image frame source 112, acquires a plurality of image frames with different exposures. In some examples, the first image frame source may alternate between a first set of exposure settings (e.g., long exposure settings) and a second set of exposure settings (e.g., short exposure settings) to acquire alternating long-exposure image frames and short-exposure image frames. In other examples, the first image frame source may alternate between more than two sets of exposure settings. For example, a third set of exposure settings (e.g., medium exposure settings) may be included such that the first image frame source acquires alternating long, medium, and short-exposure image frames over time.

Meanwhile, at 710, method 700 acquires image frames with a second image frame source with a high frame rate, low resolution, and a same exposure. Method 700 may acquire the image frames with the second image frame source, such as the image frame source 114, while also acquiring the image frames from the first image frame source.

At 715, method 700 aligns the image frames of the first image frame source and the second image frame source. Further, at 720, method 700 performs motion model analysis of the image frames from the second image frame source to determine motion vectors. Method 700 may further account for the relative positioning of the first and second image frame sources, for example, to correct parallax errors.

At 725, method 700 interpolates the image frames from the first image frame source based on the motion vectors to generate a combined HDR image. By using the motion vectors acquired from the image frames of the second image frame source, the alignment and interpolation of the image frames from the first image frame source is improved. If the capture blur of the image frames is not equalized (e.g., via a deconvolution or blur kernel) and aligned, the shorter exposure looks sharper and offset from the longer exposure. Therefore, optionally, a deconvolution kernel or blur kernel may be determined from the motion vectors as described hereinabove, and the kernel is applied to adjust the blur of the image frames from the first image frame source so that when combined all objects within the image frames have the same look. To interpolate the image frames, the image frames may be selectively merged together. For example, pixel values of the long exposure image frames may be reduced so that they represent the same scene luminance values that are captured by the short exposure image frames. When the long exposure image frame is saturated and no longer able to capture the details for high light areas, the pixels from shorter exposure image frames are used to fill in the details. At 730, method 700 outputs the combined image. For example, method 700 may output the combined image to the display 130. Method 700 then returns.

FIG. 8 shows a high-level block diagram illustrating a method 800 for leveraging image frames with a same exposure to improve interpolation of image frames with different exposures to generate a high-dynamic-range image according to an embodiment. For example, method 800 visually depicts an example of method 700 wherein several different exposure settings are used.

As depicted, a first set of image frames 810 including a first image frame 812, a second image frame 814, and a third image frame 816 is acquired with a first image frame source, such as the image frame source 112. The first image frame 812 is acquired with a long exposure, the second image frame 814 is acquired with a medium exposure, and the third image frame 816 is acquired with a short exposure.

Meanwhile, a second set of image frames 820 including a first image frame 822, a second image frame 823, a third image frame 824, a fourth image frame 825, and a fifth image frame 826 are acquired with a second, different image frame source, such as the image frame source 114. The image frames 820 are acquired with a same exposure and a low resolution. Further, the image frames 820 are acquired with a higher frame rate in comparison to the frame rate of the image frames 810 from the first image frame source, as depicted. In this way, motion estimation may be performed with the second set of image frames 820 which may be leveraged for blur correction of the first set of image frames 810, for example as described hereinabove with regard to FIG. 3.

As depicted, the outputs between the different image frame sources are aligned 830 at least between the medium-exposure image frame 814 and the third image frame 824, based on the assumption that the exposure of the third image frame 824 is the same as the exposure of the medium-exposure image frame 814. In general, frames with a same exposure from the different image frame sources are aligned. The second set of image frames 820 is used for motion estimation over time, which may be difficult to perform for the first set of image frames 810 given the different exposure rates. The first set of image frames 810 are interpolated 835 based on the motion estimated from the second set of image frames 820 to generate a combined HDR image 840.

It should be appreciated that while FIGS. 7 and 8 are described with regard to obtaining a single combined HDR image, the methods may be executed repeatedly to acquire HDR video. For example, method 700 may be repeated to generate a plurality of combined image frames, which may be displayed with the resulting frame rate as HDR video.

In some examples, more than two image frame sources may be used to acquire image frames, and the data from each stream of image frames from the multiple image frame sources may be leveraged to produce an improved final output. As an illustrative example, FIG. 9 shows a high-level flow chart illustrating an example method 900 for generating high-frame-rate video from output of a plurality of image frame sources acquiring at low frame rates according to an embodiment. Method 900 is described with regard to the systems and components of FIG. 1, though it should be appreciated that the method 900 may be implemented with other systems and components without departing from the scope of the present disclosure. Method 900 may be implemented as instructions in memory 124, for example, executable by the image processor 120 to perform the actions described herein.

Method 900 begins at 905. At 905, method 900 acquires image frames from two or more image frame sources with a same frame rate and staggered acquisition times. As an example, the image frame sources may acquire image frames at a frame rate of 24 frames per second. For staggered acquisition times, the initial starting acquisition time for each image frame source is delayed with respect to each other such that none of the image frame sources simultaneously acquire image frames. The distance intervals between the starting times are controllable or adjustable to adjust the smoothness of the final video. For example, the intervals may be equal so that the acquisitions are evenly distributed over time. Alternatively, one or more of the intervals may be increased to increase the smoothness of the final video, or decreased to decrease the smoothness.

At 910, method 900 arranges the image frames from all of the image frame sources into a single set of image frames according to the order of acquisition. Continuing at 910, method 900 analyzes the set of image frames from all of the image frame sources to generate motion vectors. As the different image frame sources or cameras may exhibit tilt error, wrong start timing, different lighting conditions, and so on, motion estimation and motion compensation may be applied to the full set of image frames in order to minimize artifacts or substantial discontinuities (e.g., flashing) between image frames. Then, at 915, method 900 applies motion correction to the set of image frames based on the motion vectors to generate final image frames.

At 920, method 900 outputs the final image frames. For example, method 900 may output the final image frames to the display 130. The final image frames are displayed as a video with a higher frame rate than the frame rate of the individual image frame sources. For example, for a multi-camera system including five image frame sources, if the frame rate of the acquisition for each image frame source is 24 frames per second, the frame rate of the final image frames is 120 frames per second. Method 900 then returns.

The initial start time for acquiring image frames for each image frame source may be selected to determine the appearance of the final image frames or the final video. As an illustrative example, FIG. 10 shows a timing diagram 1000 illustrating acquisition times for a plurality of image frame sources to generate high-frame-rate video according to an embodiment. In particular, the timing diagram 1000 illustrates the acquisition times for five cameras or five image frame sources, including a zeroth camera (Cam 0), a first camera (Cam 1), a second camera (Cam 2), a third camera (Cam 3), and a fourth camera (Cam 4).

As depicted by the acquisition timing 1002 for the zeroth camera, the zeroth camera acquires a first image frame 1004 at time t0, a second image frame 1005 at time t5, and a third image frame 1006 at time t10. The interval 1008 between the first image frame 1004 and the second image frame 1005 establishes the base motion sample frequency.

As depicted by the acquisition timing 1012 for the first camera, the first camera acquires a first image frame 1014 at time t1, and a second image frame 1015 at time t6. The interval 1018 between the acquisition of the first image frame 1004 by the zeroth camera and the acquisition of the first image frame 1014 by the first camera establishes the motion linearity.

As depicted by the acquisition timing 1022 for the second camera, the second camera acquires a first image frame 924 at time t2, and a second image frame 1025 at time t7. The interval 1028 between the acquisition of the first image frame 1014 by the first camera and the acquisition of the first image frame 1024 by the second camera, along with the interval 1018, further determines the motion linearity.

As depicted by the acquisition timing 1032 for the third camera, the third camera acquires a first image frame 1034 at time t3, and a second image frame 1035 at time t8. The interval 1038 between the acquisition of the first image frame 1024 by the second camera and the acquisition of the first image frame 1034 by the third camera defines the level of coherence or the level of smoothness of the final video.

Further, as depicted by the acquisition timing 1042 for the fourth camera, the fourth camera acquires a first image frame 1044 at time t4, and a second image frame 1045 at time t9. The timing for acquiring the first image frame 1044 may be based on the interval 1028, in some examples, such that the interval between time t3 and time t4 equals the interval 1028 between time t1 and time t2. However, the acquisition timing 1042 for the fourth camera may be adjusted to control the temporal coherence, which is set by the interval 1048 between the time t4 and the time t5.

Thus, the interval 1008 determines the base motion sample frequency, the intervals 1014 and 1018 define the motion linearity, and the interval 1038 defines the level of coherence for the final video comprising a fusion of the image frames from all of the image frame sources. The intervals may be adjusted according to a desired appearance of the final video.

FIG. 11 shows a high-level block diagram illustrating an example data flow 1100 for managing multiple image frame streams with adjustments for temporal coherence and motion blur according to an embodiment. In particular, the data flow 1100 depicts the management of multiple image frame streams from a multi-camera system or a plurality of image frame sources 1105 including a zeroth camera (C0) or zeroth image source 1110, a first camera (C1) or first image source 1111, a second camera (C2) or second image source 1112, a third camera (C3) or third image source 1113, and a fourth camera (C4) or fourth image source 1114. Each camera or image frame source of the plurality of image frame sources 1105 may capture image frames at a same frame rate, for example as described hereinabove, with different acquisition settings.

For example, the image frame sources 1105 may be controlled according to timing control inputs 1106 which include a first time interval dt1 that controls an initial acquisition time of the first image frame source 1111 relative to an initial acquisition of the zeroth image frame source 1110, a second time interval dt2 that controls an initial acquisition time of the second image frame source 1112 relative to the initial acquisition time of the first image frame source 1111, a third time interval dt3 that controls an initial acquisition time of the third image frame source 1113 relative to the initial acquisition time of the second image frame source 1112, and a fourth time interval dt4 that controls an initial acquisition time of the fourth image frame source 1114 relative to the initial acquisition time of the third image frame source 1113.

The image frame sources 1105 may be further controlled according to shutter angle control inputs 1108 for controlling the shutter angle of each image frame source. For example, the shutter angle control inputs 1108 may include a zeroth shutter angle for the zeroth image frame source 1110, a first shutter angle for the first image frame source 1111, a second shutter angle for the second image frame source 1112, a third shutter angle for the third image frame source 1113, and a fourth shutter angle for the fourth image frame source 1114. The timing control inputs 1106 and the shutter angle control inputs 1108 may be selected according to a desired motion appearance, as described hereinabove.

The plurality of image frame sources 1105 outputs a corresponding plurality of low-frame-rate image frame streams 1120 to a multi-stream management module 1130. The multi-stream management module 1130 interleaves the plurality of image frame streams 1120 to generate a single high-frame-rate image frame stream 1132. For example, if the low frame rate of each image frame source of the plurality of image frame sources 1105 is 24 fps, then the multi-stream management 1130 combines all of the image frames into a single stream of image frames with a frame rate of 120 fps, since five image frame sources multiplied by 24 fps per source results in 120 fps. The frame rate of the single image frame stream 1132 thus depends on the number of image frame sources in the plurality of image frame sources 1105 as well as the original frame rate for each image frame source. While five image frame sources are depicted as acquiring image frames at 24 fps, it should be appreciated that a different number of image frame sources may be used to acquire image frames at a different frame rate than 24 fps. The particular settings depend on the configuration of the image frame sources (e.g., the number of image frame sources) as well as the desired final frame rate of the single image frame stream 1132.

The multi-stream management module 1130 also outputs the image frame streams 1120 and/or the single image frame stream 1132 to a motion analysis module 1140 for analyzing motion between the image frames. The motion analysis module 1140 may analyze motion between image frames in individual stream of the plurality of image frame streams 1120, for example. Additionally or alternatively, the motion analysis module 1140 may analyze motion between image frames in the single image frame stream 1132. The motion analysis module 1140 generates a motion model 1142 comprising, for example, motion vectors depicting motion of objects on a block-by-block and/or a global level between image frames.

The motion model 1140 and the single image frame stream 1132 are input to a temporal coherence adjustment module 1150 which may adjust the temporal coherence of the single image frame stream 1132, for example, based on the motion model 1142. For example, the temporal coherence adjustment module 1150 may adjust the phases of one or more image frames in the single image frame stream 1132 by adjusting or scaling the motion vectors of the motion model 1142, as described hereinabove. In some examples, the temporal coherence adjustment module 1150 may not apply temporal coherence adjustments if the temporal coherence of the single image frame stream 1132 already corresponds to a desired temporal coherence.

The single image frame stream 1132, after optional temporal coherence adjustments by the temporal coherence adjustment module 1150, is input along with the motion model 1142 to a motion blur adjustment module 1160. The motion blur adjustment module 1160 determines one or more deconvolution or blur kernels based on the motion model 1142 and applies the kernel(s) to the image frames of the single image frame stream 1132. The motion blur adjustment module 1160 thus outputs a high-frame-rate single image frame stream 1162. Thus, a plurality of low-frame-rate image frame streams may be combined into a single high-frame-rate image frame stream, with temporal coherence adjustments and blur adjustments to achieve a high-frame-rate video with a desired motion appearance and a consistent look.

In some examples, multiple image frame streams may be integrated into a single image frame stream without additional adjustments to temporal coherence and blur. As an illustrative example, FIG. 12 shows a high-level block diagram illustrating an example data flow 1200 for managing multiple image frame streams according to an embodiment. In particular, similar to the data flow 1100, the data flow 1200 depicts the management of multiple image frame streams from a multi-camera system or a plurality of image frame sources 1205 including a zeroth camera (C0) or zeroth image source 1210, a first camera (C1) or first image source 1211, a second camera (C2) or second image source 1212, a third camera (C3) or third image source 1213, and a fourth camera (C4) or fourth image source 1214. Each camera or image frame source of the plurality of image frame sources 1205 may capture image frames at a same frame rate, for example as described hereinabove, with different acquisition settings.

For example, the image frame sources 1205 may be controlled according to timing control inputs 1206 which include a first time interval dt1 that controls an initial acquisition time of the first image frame source 1211 relative to an initial acquisition of the zeroth image frame source 1210, a second time interval dt2 that controls an initial acquisition time of the second image frame source 1212 relative to the initial acquisition time of the first image frame source 1211, a third time interval dt3 that controls an initial acquisition time of the third image frame source 1213 relative to the initial acquisition time of the second image frame source 1212, and a fourth time interval dt4 that controls an initial acquisition time of the fourth image frame source 1214 relative to the initial acquisition time of the third image frame source 1213.

The image frame sources 1205 may be further controlled according to shutter angle control inputs 1208 for controlling the shutter angle of each image frame source. For example, the shutter angle control inputs 1208 may include a zeroth shutter angle for the zeroth image frame source 1210, a first shutter angle for the first image frame source 1211, a second shutter angle for the second image frame source 1212, a third shutter angle for the third image frame source 1213, and a fourth shutter angle for the fourth image frame source 1214. The timing control inputs 1206 and the shutter angle control inputs 1208 may be selected according to a desired motion appearance, as described hereinabove.

The plurality of image frame sources 1205 outputs a corresponding plurality of low-frame-rate image frame streams 1220 to a multi-stream management module 1230. The multi-stream management module 1230 interleaves the plurality of image frame streams 1220 to generate a single high-frame-rate image frame stream 1232. The look and feel of the video corresponding to the single high-frame-rate image frame stream 1232 is thus established by the control inputs 1206 and 1208.

FIG. 13 shows a diagram 1300 illustrating motion vectors between image frames acquired by a plurality of image frame sources to generate high-frame-rate video according to an embodiment. In particular, the diagram 1300 illustrates the acquisition times described hereinabove with regard to FIG. 10 for five cameras or five image frame sources, including a zeroth camera (Cam 0), a first camera (Cam 1), a second camera (Cam 2), a third camera (Cam 3), and a fourth camera (Cam 4). As depicted, the diagram 300 includes the acquisition timings 1002, 1012, 1022, 1032, and 1042 for the zeroth camera, the first camera, the second camera, the third camera, and the fourth camera, respectively.

For the image frames depicted according to the different acquisition timings, a plurality of motion vectors may be calculated. The plurality of motion vectors may include motion vectors between image frames for each image frame source or camera. For example, the plurality of motion vectors may include a motion vector 1307 between the image frame 1004 and the image frame 1005 for the zeroth camera, a motion vector 1317 between the image frame 1014 and the image frame 1015 for the first camera, a motion vector 1327 between the image frame 1024 and the image frame 1025 for the second camera, a motion vector 1337 between the image frame 1034 and the image frame 1035 for the third camera, and a motion vector 1347 between the image frame 1044 and the image frame 1045 for the fourth camera.

As discussed hereinabove, the timing of the acquisition for each image frame source may be adjusted to control the overall look and feel of the final fused video. In some examples, the intervals for each image frame source may be determined relative to the acquisition of the zeroth camera. For example, the time t1 for acquiring the first image frame 1014 via the first camera may be equal to t0+dt1, where dt1 is the interval between t0 and t1. Similarly, the time t2 may be expressed as t0+dt2, the time t3 may be expressed as t0+dt3, the time t4 may be expressed as t0+dt4, the time t6 may be expressed as t5+dt1, the time t7 may be expressed as t5+dt2, and so on.

These motion vectors between image frames for each image frame source may be used to generate or interpolate intermediate image frames between the acquired image frames. For example, the motion vector 1307 may be used to calculate motion vectors for four phases between the first image frame 1004 and the second image frame 1005. These calculated motion vectors may then be used to generate an image frame for each of the four phases based on the first image frame 1004 and the second image frame 1005. The four phases may be determined based on the intervals between image acquisitions for all of the cameras or image frame sources. For example, the phases between time t0 and time t5 for the intermediate image frames between image frames 1004 and 1005 may comprise dt1/(t5-t0), dt2/(t5-t0), dt3/(t5-t0), and dt4/(t5-t0).

Similarly, the motion vector 1317 for the first camera may be used to calculate motion vectors for four phases between the first image frame 1014 and the second image frame 1015 for the first camera. These calculated motion vectors may then be used to generate an image frame for each of the four phases based on the first image frame 1014 and the second image frame 1015. The four phases may be determined based on the intervals. For example, the phases between time t0 and time t5 for the intermediate image frames between image frames 1014 and 1015 may comprise (dt2-dt1)/(t5-t0), (dt3-dt2)/(t5-t0), (dt4-dt3)/(t5-t0), and (t5-t0-dt1)/(t5-t0).

The motion vector 1327 for the second camera may be used to calculate motion vectors for four phases between the first image frame 1024 and the second image frame 1025 for the second camera. These calculated motion vectors may then be used to generate an image frame for each of the four phases based on the first image frame 1024 and the second image frame 1025. For example, the phases between time t0 and time t5 for the intermediate image frames between image frames 1024 and 1025 may comprise (dt3-dt2)/(t5-t0), (dt4-dt3)/(t5-t0), (t5-t0-dt2)/(t5-t0), and (t5-t0-(dt2-dt1))/(t5-t0).

The motion vector 1337 for the third camera may be used to calculate motion vectors for four phases between the first image frame 1034 and the second image frame 1035 for the third camera. These calculated motion vectors may then be used to generate an image frame for each of the four phases based on the first image frame 1034 and the second image frame 1035. For example, the phases between time t0 and time t5 for the intermediate image frames between image frames 1034 and 1035 may comprise (dt4-dt3)/(t5-t0), (t5-t0-dt3)/(t5-t0), (t5-t0-(dt3-dt1))/(t5-t0), and (t5-t0-(dt3-dt2))/(t5-t0).

Further, the motion vector 1347 for the fourth camera may be used to calculate motion vectors for four phases between the first image frame 1044 and the second image frame 1045 for the fourth camera. These calculated motion vectors may then be used to generate an image frame for each of the four phases based on the first image frame 1044 and the second image frame 1045. For example, the phases between time t0 and time t5 for the intermediate image frames between image frames 1044 and 1045 may comprise (t5-t0-dt4)/(t5-t0), (t5-t0-(dt4-dt1))/(t5-t0), (t5-t0-(dt4-dt2))/(t5-t0), and (t5-t0-(dt4-dt3))/(t5-t0).

The plurality of motion vectors may further include motion vectors between image frames from different image frame sources. For example, as depicted, the plurality of motion vectors may include a motion vector 1309 between the image frame 1004 from the zeroth camera and the image frame 1014 from the first camera, a motion vector 1329 between the image frame 1014 from the first camera and the image frame 1024 from the second camera, a motion vector 1339 between the image frame 1024 from the second camera and the image frame 1034 from the third camera, and a motion vector 1349 between the image frame 1034 from the third camera and the image frame 1044 from the fourth camera. These motion vectors between image frames from different image frame sources may be used to account for potential image shifts between the cameras. For example, the motion vector 1309 calculated between image frame 1004 from the zeroth camera and image frame 1014 from the first camera is a motion vector field that may be used to account for a difference in positions of the zeroth camera and the first camera as well as image shifts between the image frames 1004 and 1014 in general. Similarly, the motion vector 1329 calculated between image frame 1014 from the first camera and image frame 1024 from the second camera is a motion vector field that may be used to account for potential image shifts between the first camera and the second camera, the motion vector 1339 calculated between image frame 1024 from the second camera and image frame 1034 from the third camera is a motion vector field that may be used to account for potential image shifts between the second camera and the third camera, and the motion vector 1349 calculated between image frame 1034 from the third camera and image frame 1044 from the fourth camera is a motion vector field that may be used to account for potential image shifts between the third camera and the fourth camera.

At each capture time, image fusion is applied based on these motion vector fields between the cameras. Further, these motion vector fields may be approximated by using the global motion vector of the field. The final video comprises a fusion of the image frames from all five image frame sources.

Thus, various embodiments of image processing for multiple image frame sources or cameras are provided. In one embodiment, a method comprises acquiring image frames with a plurality of image frame sources configured with different acquisition settings, processing the image frames based on the different acquisition settings to generate at least one final image frame, and outputting the at least one final image frame. The at least one final image frame is output to one or more of a display (e.g., for displaying the at least one final image frame) and a memory (e.g., to store the at least one final image frame for subsequent post-processing and/or display).

In a first example of the method, acquiring the image frames with the plurality of image frame sources configured with different acquisition settings comprises acquiring a first set of image frames with a first image frame source and a second set of image frames with a second image frame source, wherein the first set of image frames are acquired with a low resolution and a high frame rate, and the second set of image frames are acquired with a high resolution and a low frame rate. In a second example of the method optionally including the first example, the method further comprises aligning at least one image frame from the first set of image frames with an image frame from the second set of image frames. In a third example of the method optionally including one or more of the first and second examples, processing the image frames based on the different acquisition settings to generate the at least one final image frame comprises estimating motion in the first set of image frames. In a fourth example of the method optionally including one or more of the first through third examples, processing the image frames based on the different acquisition settings to generate the at least one final image frame further comprises sharpening the second set of image frames with a deconvolution kernel determined from the estimated motion in the first set of image frames. In a fifth example of the method optionally including one or more of the first through fourth examples, processing the image frames based on the different acquisition settings to generate the at least one final image frame further comprises interpolating high-resolution image frames between the image frames of the second set of image frames based on the estimated motion to generate a set of final image frames. In a sixth example of the method optionally including one or more of the first through fifth examples, acquiring the image frames with the plurality of image frame sources comprises acquiring a first set of image frames with a first image frame source, each image frame of the first set of image frames acquired with a different exposure setting, and acquiring a second set of image frames with a second image frame source, wherein the second set of image frames are acquired with consistent exposure settings. In a seventh example of the method optionally including one or more of the first through sixth examples, processing the image frames based on the different acquisition settings to generate at least one final image frame comprises estimating motion in the second set of image frames, and interpolating the first set of image frames based on the estimated motion in the second set of image frames to generate the at least one final image frame. In an eighth example of the method optionally including one or more of the first through seventh examples, the method further comprises arranging the image frames into a single set of image frames according to order of acquisition of the image frames, each image frame source configured with an acquisition frame rate, wherein the different acquisition settings comprises different initial start times for each image frame source, and wherein intervals between the initial start times for each image frame source are adjustable to control an appearance of a video formed from the single set of image frames. In a ninth example of the method optionally including one or more of the first through eighth examples, the method further comprises estimating motion between image frames in the single set of image frames, and applying motion compensation to the image frames based on the estimated motion to generate a motion-corrected set of image frames with a frame rate higher than the acquisition frame rate, wherein the at least one final image frame comprises the motion-corrected set of image frames.

In another embodiment, a method comprises acquiring a first set of image frames with a first image frame source, acquiring a second set of image frames with a second image frame source, the first set of image frames acquired in parallel with the second set of image frames, estimating motion in the second set of image frames, generating at least one corrected image frame from the first set of image frames and the estimated motion, and outputting the at least one corrected image frame to a display.

In a first example of the method, the first image frame source acquires the first set of image frames with a high resolution and a low frame rate, and wherein the second image frame source acquires the second set of image frames with a low resolution and a high frame rate. In a second example of the method optionally including the first example, the method further comprises filtering the first set of image frames with a deconvolution kernel determined from the estimated motion to adjust blur in the first set of image frames. In a third example of the method optionally including one or more of the first and second examples, the first image frame source acquires the first set of image frames with alternating exposure settings, and the second image frame source acquires the second set of image frames with a single set of exposure settings. In a fourth example of the method optionally including one or more of the first through third examples, the method further comprises aligning at least one image frame from the first set of image frames with a corresponding image frame from the second set of image frames.

In yet another embodiment, a system comprises an image processor configured with instructions in non-transitory memory that when executed cause the image processor to: acquire, via a plurality of image frame sources configured with different acquisition settings, a plurality of image frames; process the plurality of image frames based on the different acquisition settings to generate at least one final image frame; and output the at least one final image frame to a display.

In a first example of the system, to acquire the image frames with the plurality of image frame sources configured with different acquisition settings, the image processor is configured with instructions that when executed cause the image processor to acquire a first set of image frames with a first image frame source and a second set of image frames with a second image frame source, wherein the first set of image frames are acquired with a low resolution and a high frame rate, and the second set of image frames are acquired with a high resolution and a low frame rate. In a second example of the system optionally including the first example, to process the image frames based on the different acquisition settings to generate the at least one final image frame, the image processor is further configured with instructions that when executed cause the image processor to estimate motion in the first set of image frames, and interpolate high-resolution image frames between the image frames of the second set of image frames based on the estimated motion to generate a set of final image frames. In a third example of the system optionally including one or more of the first and second examples, to acquire the image frames with the plurality of image frame sources, the image processor is configured with instructions that when executed cause the image processor to acquire a first set of image frames with a first image frame source, each image frame of the first set of image frames acquired with a different exposure setting, and acquire a second set of image frames with a second image frame source, wherein the second set of image frames are acquired with consistent exposure settings. In a fourth example of the system optionally including one or more of the first through third examples, to process the plurality of image frames based on the different acquisition settings to generate at least one final image frame, the image processor is further configured with instructions that when executed cause the image processor to estimate motion in the second set of image frames, and interpolate the first set of image frames based on the estimated motion in the second set of image frames to generate the at least one final image frame.

In one representation, a method comprises acquiring a plurality of image frames from each image frame source of a plurality of image frame sources, each plurality of image frames acquired at a first frame rate, combining the plurality of image frames from each image frame source into a single plurality of image frames with a second frame rate higher than the first frame rate, and outputting the single plurality of image frames as a video.

In a first example of the method, the plurality of image frame sources comprises a first image frame source, a second image frame source, a third image frame source, a fourth image frame source, and a fifth image frame source, wherein the plurality of image frame sources are positioned adjacent to each other and oriented with overlapping fields of view. In a second example of the method optionally including the first example, the first frame rate comprises 24 frames per second and the second frame rate comprises 120 frames per second. In a third example of the method optionally including one or more of the first and second examples, the method further comprises staggering an initial acquisition time for each image frame source such that at most one image frame source acquires an image frame at a time. In a fourth example of the method optionally including one or more of the first through third examples, relative intervals between the initial acquisition times for the plurality of image frame sources are adjustable to control motion linearity of the single plurality of image frames. In a fifth example of the method optionally including one or more of the first through fourth examples, the method further comprises calculating motion vectors between image frames in each plurality of image frames and between image frames from different image frame sources. In a sixth example of the method optionally including one or more of the first through fifth examples, the method further comprises adjusting temporal coherence of the single plurality of image frames based on the motion vectors. In a seventh example of the method optionally including one or more of the first through sixth examples, the method further comprises adjusting motion blur of the single plurality of image frames based on the motion vectors. In an eighth example of the method optionally including one or more of the first through seventh examples, the method further comprises interpolating image frames between adjacent image frames of each plurality of image frames based on the motion vectors and the adjacent image frames, and combining the plurality of image frames from each image frame source into the single plurality of image frames based on the interpolated image frames and the motion vectors. In a ninth example of the method optionally including one or more of the first through eighth examples, a shutter angle for each image frame source is adjustable to control motion blur of the single plurality of image frames.

In another representation, a method comprises acquiring image frames from two or more image frame sources with a first frame rate and staggered acquisition times, arranging the image frames from the two or more image frame sources into a single set of image frames according to order of acquisition, calculating motion vectors for the image frames from the two or more image frame sources, applying motion correction to the single set of image frames based on the motion vectors to generate final image frames, and outputting the final image frames as a video with a second frame rate higher than the first frame rate.

In a first example of the method, calculating the motion vectors for the image frames from the two or more image frame sources comprises calculating a first set of motion vectors between adjacent image frames in the single set of image frames, and applying the motion correction to the single set of image frames based on the motion vectors comprises applying the motion correction to the single set of image frames based on the first set of motion vectors to correct for potential image shifts between image frame sources. In a second example of the method optionally including the first example, calculating the motion vectors for the image frames from the two or more image frame sources further comprises calculating a second set of motion vectors between adjacent image frames from each image frame source, and applying the motion correction to the single set of image frames based on the motion vectors further comprises interpolating image frames at phases between phases of the adjacent image frames from each image frame source based on the adjacent image frames and respective motion vectors of the second set of motion vectors, and performing image fusion of the interpolated image frames with image frames of the single set of image frames based on the first set of motion vectors. In a third example of the method optionally including one or more of the first and second examples, the two or more image frame sources comprises five image frame sources, the first frame rate comprises 24 frames per second, and the second frame rate comprises 120 frames per second. In a fourth example of the method optionally including one or more of the first through third examples, the staggered acquisition times are adjusted based on a desired look and feel of the video.

In yet another representation, a system comprises an image processor configured with instructions in non-transitory memory that when executed cause the image processor to: acquire, via a plurality of image frame sources configured with different acquisition settings, a plurality of image frames from each image frame source, each plurality of image frames acquired at a first frame rate and with a different initial acquisition time than other image frame sources; combine the plurality of image frames from each image frame source into a single plurality of image frames with a second frame rate higher than the first frame rate; and output the single plurality of image frames as a video with the second frame rate.

In a first example of the system, the image processor is further configured with instructions in the non-transitory memory that when executed cause the image processor to calculate motion vectors between image frames in each plurality of image frames and between image frames from different image frame sources. In a second example of the system optionally including the first example, the image processor is further configured with instructions in the non-transitory memory that when executed cause the image processor to adjust temporal coherence of the single plurality of image frames based on the motion vectors. In a third example of the system optionally including one or more of the first and second examples, the image processor is further configured with instructions in the non-transitory memory that when executed cause the image processor to adjust motion blur of the single plurality of image frames based on the motion vectors. In a fourth example of the system optionally including one or more of the first through third examples, the image processor is further configured with instructions in the non-transitory memory that when executed cause the image processor to interpolate image frames between adjacent image frames of each plurality of image frames based on the motion vectors and the adjacent image frames, and combine the plurality of image frames from each image frame source into the single plurality of image frames based on the interpolated image frames and the motion vectors.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
acquiring image frames with a plurality of image frame sources configured with different acquisition settings, including acquiring a first set of image frames with a first image frame source through a first lens, the first set of image frames being acquired with a low resolution and a high frame rate, and acquiring a second set of image frames with a second image frame source through a second lens, the second set of image frames being acquired with a high resolution and a low frame rate;
searching the first set of image frames and the second set of image frames to produce one or more parameters to correct a parallax error between the first set of image frames and the second set of image frames;
processing the image frames based on the different acquisition settings and the one or more parameters to generate at least one final image frame; and
outputting the at least one final image frame.

2. The method of claim 1, wherein the first set of image frames forms a first video and the second set of image frames forms a second video.

3. The method of claim 2, wherein processing the image frames based on the different acquisition settings to generate the at least one final image frame comprises estimating motion in the first set of image frames.

4. The method of claim 3, wherein processing the image frames based on the different acquisition settings to generate the at least one final image frame further comprises sharpening the second set of image frames with a deconvolution kernel determined from the estimated motion in the first set of image frames.

5. The method of claim 3, wherein processing the image frames based on the different acquisition settings to generate the at least one final image frame further comprises interpolating high-resolution image frames between the image frames of the second set of image frames based on the estimated motion to generate a set of final image frames forming a final video.

6. The method of claim 1, wherein each image frame of the first set of image frames is acquired with a different exposure setting, and the second set of image frames are acquired with consistent exposure settings.

7. The method of claim 6, wherein processing the image frames based on the different acquisition settings to generate at least one final image frame comprises estimating motion in the second set of image frames, and interpolating the first set of image frames based on the estimated motion in the second set of image frames to generate the at least one final image frame.

8. The method of claim 1, further comprising arranging the image frames into a single set of image frames according to order of acquisition of the image frames, each image frame source configured with an acquisition frame rate, wherein the different acquisition settings comprises different initial start times for each image frame source, and wherein intervals between the initial start times for each image frame source are adjustable to control an appearance of a video formed from the single set of image frames.

9. The method of claim 8, further comprising estimating motion between image frames in the single set of image frames, and applying motion compensation to the image frames based on the estimated motion to generate a motion-corrected set of image frames with a frame rate higher than the acquisition frame rate, wherein the at least one final image frame comprises the motion-corrected set of image frames.

* * * * *